Patented Oct. 21, 1952

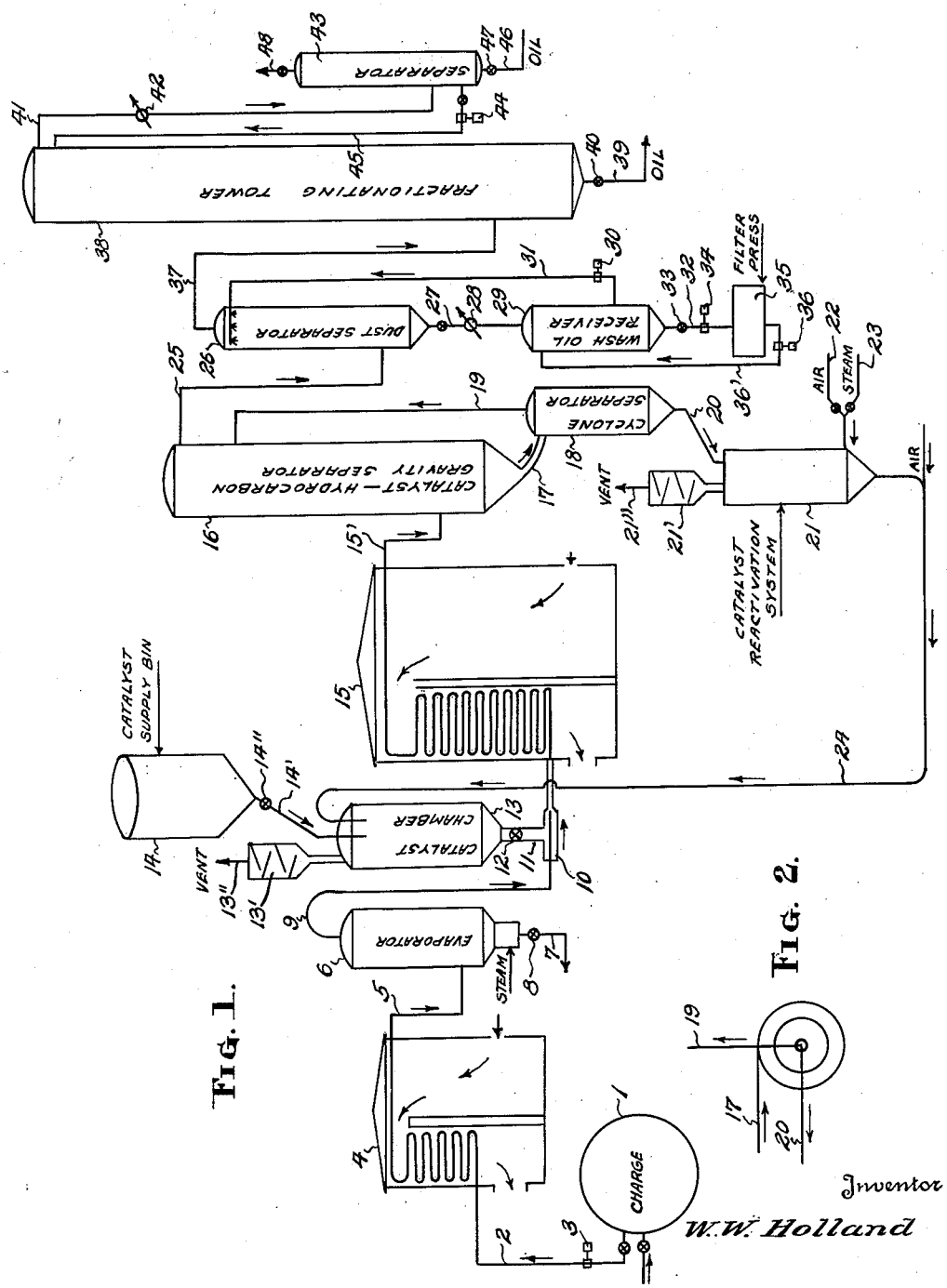

2,614,659

UNITED STATES PATENT OFFICE 2,614,659

PROCESS FOR THE SEPARATION OF POWDERED CATALYST FROM A STREAM OF GASEOUS HYDROCARBONS

William W. Holland, Baltimore, Md., assignor to The Gyro Process Company, Detroit, Mich., a corporation of Michigan Application July 10, 1948, Serial No. 38,154

5 Claims. (Cl. 183—122)

This invention relates to a process for effecting the molecular decomposition of heavier hydrocarbon oils for the production of lighter hydrocarbons within the motor fuel boiling range with particular reference to high temperature systems wherein the oil is in the vapor phase while undergoing conversion; and novel apparatus for carrying out the process.

The invention comprehends a vapor phase catalytic cracking process whereby hydrocarbon oils are converted to lighter hydrocarbons boiling within the motor fuel range, the conversion being carried out in the presence of a fluid catalyst which is separated from the cracked vapors, reactivated, and then returned for injection into additional unconverted oil vapors to be processed; a catalytic process for vapor phase cracking in which a fluid catalyst composed of impalpable powder is injected with steam into a moving stream of oil vapors into a cracking coil where conversion takes place, the converted hydrocarbons and catalyst mixture being separated by means of gravity separation, centrifugal separation and oil washing, recycling of catalyst and fractionation and refining of converted vapors; a process in which the temperature of hot converted hydrocarbon vapors is controlled for fractionation by the temperature of wash oil utilized in separating catalyst from the vapors; and apparatus for carrying out the novel process; all of which are hereinafter described and claimed.

A primary object of the invention is the continuous introduction of a fluidized catalyst of the siliceous type into a rapidly moving vapor stream of oil vapors which vapors are obtained by separation from unvaporized fractions of oil heated to vaporization temperature, the catalyst having been reduced to the state of an impalpable powder, permitting it to flow freely and to be readily and uniformly distributed throughout the oil vapor during the course of its passage in a continuously moving stream through a confined high temperature conversion zone wherein decomposition is effected, and means and methods whereby separation of catalyst and refining of decomposed vapors are economically and efficiently conducted. Other objects will be apparent from the following description and claims.

In accordance with this invention the oil is first heated to the vaporization temperature and the vapors are separated from any remaining unvaporized fractions. The vapors are then passed in a continuously moving stream through a confined high temperature conversion zone wherein decomposition is effected in the presence of a fluid catalytic agent which is injected continuously in the stream. The presence of the catalyst facilitates decomposition of the hydrocarbons to the extent that considerably milder temperatures may be employed than those required in similar thermal operations. It also presents advantages not common to thermal cracking in that it retards the production of the so-called "fixed gases" and coke, as well as gum-forming compounds and color-imparting materials which are removed with difficulty from the cracked distillate. The outstanding advantage of catalytic cracking, however, is the production of higher octane motor fuel than that obtained by other cracking processes, either in the liquid or vapor phase.

As the decomposition reaction proceeds polymerization reactions take place concurrently, and it is thought that the presence of the catalyst uniformly distributed throughout the moving body of oil vapors, constantly offering new surfaces of contact, promotes polymerization of the olefin gases produced in the decomposition reaction to form liquefiable fractions within the gasoline boiling range, thus accounting for the limited production of "fixed gases."

In thermally cracking normally liquid hydrocarbons in the vapor phase, temperatures of the order of about 1100° to 1300° F. are usually required, depending upon the character of the charging stock, while the same charge may be cracked in the presence of a suitable catalyst at temperatures of about 900° to 1100° F., thus imposing less severe operating conditions upon the mechanical equipment. The advantage of the lower temperature is reflected as an important economic factor in the maintenance costs.

The fluidized catalyst continuously admixed with the vaporized oil as it passes through the system has a distinct advantage over a stationary catalyst bed in that fresh catalytically active surfaces are constantly contacting every portion of the oil vapor, thus insuring the maximum catalytic activity at all times, whereas the activity of a stationary catalyst drops rapidly from the first moment of contact, requiring reactivation at frequent intervals, i. e., about every twenty to thirty minutes. This necessitates very expensive duplicate equipment throughout the conversion zone, one catalytic vessel undergoing reactivation while another is "on stream." It has been found by experience that in order to approach continuous operation in such installations at least six of such vessels are required.

Furthermore, the pellet type of catalyst used in the stationary bed offers but a small fraction of the contact surface of a pulverized catalyst, necessitating the employment of a much greater quantity of catalytic material.

The fluidized catalyst reactivation system, which consists in passing the spent catalyst by gravity flow through an atmosphere of oxygen (or air) and stream to burn out the accumulated carbon and organic matter, operates on the same time schedule as that required for the combined hydrocarbon decomposition and catalyst-hydrocarbon separation, so that the operation is continuous in every respect, the reactivated catalyst being returned by air conveyance to the catalyst chamber for reuse. A small amount of make-up catalyst is required from time to time to replace unavoidable losses in the several operations, and this is injected into the system from the catalyst supply bin.

Recovery and separation of the catalyst is accomplished in a number of stages which includes gravity separation, cyclonic or centrifugal separation, and washing or dust separation. The separated converted vapors are fractionated and refined, and the temperature of the fractionation is controlled by the temperature of the wash oil used in separating catalytic dust from the converted vapors.

For a further understanding of the process and apparatus herein described, reference may be had to the accompanying drawings forming a part of this specification, wherein:

Figure I illustrates diagrammatically apparatus and equipment preferred in carrying out my invention, and Figure II is a cross sectional view of a cyclone type separator preferred in separating the last traces of the hydrocarbon vapors from the spent catalyst.

Referring more particularly to the drawing, numeral I is a tank containing a supply of charging stock which may be any grade of light, intermediate or heavy hydrocarbon oil. The oil is withdrawn from the supply tank by way of line 2, and by means of pump 3 it is forced through a pipe still 4 wherein it is heated to its vaporization temperature. Leaving the pipe still through line 5 the vaporized oil enters an evaporator 6 wherein separation is effected between the vaporized and incompletely vaporized fractions, the latter settling to the bottom while the vapors pass off overhead. Steam is introduced in the lower restricted section of the evaporator to assist in the separation, the heavy unvaporized fractions being withdrawn from the bottom through line 7, controlled by valve 8, and diverted from the system for use as fuel oil.

Leaving the top of the evaporator through line 9, the oil vapors commingled with steam enter an injector 10 constructed somewhat on the principle of the device used for introducing feed water into a steam boiler by the direct action of live steam. On the upper side of the injector is a comparatively large opening adapted to receive a pipe 11 containing a valve 12, communicating directly with a vertical chamber 13 containing the finely divided catalyst. The preferred catalyst is of the bentonite type, which may be represented by the formula $$Al_2Si_4O_{10}(OH)_2H_2O$$

As a mixture of oil vapors and steam pass through the injector at a high velocity a partial vacuum is created in that portion of the pipe below the valve, so that when the valve is partly opened catalyst is withdrawn from the chamber into the annular space of the injector from which it is continuously fed into the system intimately mixed in any desired amounts with the oil vapors passing through the injector, the rate of catalyst flow being governed by said valve.

In the operation of such a system a small amount of catalyst is unavoidably lost at one stage or another so that make-up catalyst must be added at intervals. This is accomplished by the addition of fresh catalyst from the supply bin 14 to the catalyst chamber when necessary.

The mixture of oil vapor, steam and catalyst leaving the injector at a high velocity enter a second pipe still 15 wherein a sufficiently high temperature is maintained to effect the desired degree of decomposition of the heavy hydrocarbon vapors into lighter hydrocarbons, usually within the range of 900° to 1100° F., and at substantially atmospheric pressure. The presence of steam at this stage of the operation serves the purpose of retarding the corrosive action of impurities usually found in oil, notably sulfur compounds, upon the heating elements.

Leaving the pipe still through line 15' the decomposed hydrocarbons, together with the steam and catalyst, enter a gravity separating zone 16 wherein the velocity is greatly reduced, permitting the catalyst, because of its higher specific gravity, to settle to the bottom, while the cracked vapors and steam pass off overhead. The catalyst again moving at a high velocity then passes through line 17 and into a separator 18 of the cyclone type, wherein the last traces of the hydrocarbon vapors are removed by centrifugal action and returned to the gravity separator through line 19. The dried catalyst is withdrawn from the bottom of the cyclone separator through line 20 and sent to the reactivation system 21 where its activity is restored by removal of the accumulated carbon and organic matter. This is accomplished by burning the catalyst in the presence of a countercurrent stream of oxygen (or air) and steam mixed in the proper proportions to control the combustion, yet completely consume the carbon, the air and steam being admitted to the bottom of the reactivation chamber through lines 22 and 23 respectively. The reactivated catalyst leaving the chamber is then returned to the catalyst chamber 13 by air conveyance through line 24.

The reactivation chamber is provided with a baffle trap 21' at its upper end to knock back the finely divided catalyst dust particles as they tend to escape with the combustion gases leaving the system through the vent pipe 21''.

A similar baffled trap 13' is located above the catalyst chamber 13 to catch the catalyst dust particles carried upwardly by the stream of conveyance air entering the chamber through line 24, before it leaves the system through the vent pipe 13''.

In order to replenish the small amount of catalyst unavoidably escaping through the vent pipes 13'' and 21'', which scarcely warrants the employment of an elaborate electric precipitator installation, make-up catalyst is introduced into the top of the catalyst chamber 13, when needed, from the catalyst supply bin 14 through line 14', controlled by valve 14''.

The decomposed hydrocarbon vapors and steam leaving the top of the gravity separator 16 through line 25 enter the dust separator 26, flowing upwardly in countercurrent direction to a descending spray of moderately heavy wash oil delivered to the top of the separator from the wash oil receiver 29 by pump 30 through line 31, which removes all dust particles from the vapors. The wash oil is withdrawn from the bottom of the dust separator through line 27 and cooler 28, returning to receiver 29 where the suspended solids settle to the bottom. This mixture of oil and suspended solids is withdrawn from the bottom of the receiver through line 32, controlled by valve 33, and forced by pump 34 through the filter press 35, returning to the receiver by way of pump 36, through line 36'. The amount of solids collecting in the filter press is so small that only infrequent cleaning of the press is necessary. This small quantity of catalytic material may either be discarded or sent to the catalytic reactivation system.

The decomposed dust-free hydrocarbons leaving the top of the dust separator through line 37 are now fractionated in a column 38, preferably of the bubble tower type, in order to effect separation of the light and heavy fractions, the latter being diverted from the system through line 39, controlled by valve 40, and further refined for kerosene or domestic fuel, or it may be returned to the feed tank for reprocessing.

The light fractions and uncondensable gases leaving the top of the fractionating column through line 41 and cooler 42 are delivered into a gas-liquid separator 43, a portion of the liquid fraction being returned to the top of the tower by pump 44 through line 45 as a reflux temperature control medium, the remainder of the oil being withdrawn from the separator through line 46, controlled by valve 47. This oil fraction is then treated and redistilled for the production of high octane motor fuel, or it is preferably used as a blending agent in the manufacture of such fuel because of its exceptionally high anti-knock rating.

The gas leaving the top of the separator through line 48 consists of both saturated and unsaturated hydrocarbons, primarily of the $C_2$, $C_3$ and $C_4$ types. This gas may be separated into its component parts by known means and used for the most expedient purposes. It may also be compressed and chilled for the recovery of liquid fractions suitable for motor fuel, and the unsaturated hydrocarbons in the remainder polymerized for the same purpose. However, because of the extensive demand for unsaturated hydrocarbons for chemical use, large quantities of ethylene, propylene and butylene are now being recovered from cracking operations for this purpose, rather than converting them into gasoline.

With particular reference to the cooler 28, it should be pointed out that this serves as a temperature control means following the decomposition of the hydrocarbon vapors. While the temperature is below that at which further decomposition can take place when the vapors enter the dust separator, it is still too high to filter the wash oil safely without danger of flashing because of the absorbed light fractions. The vapors leaving the top of the dust separator are also above the desirable temperature for fractionation without cooling. This cooler therefore serves the double purpose of controlling the temperatures for both the filtration and fractionation operations.

Modifications and variations may be made in the process and apparatus described without departing from the spirit of the invention, and the same is to be limited only by the limitations as defined in the appended claims.

What I claim:

1. The process of separating a powdered catalyst from a stream of hydrocarbon vapors, the steps which comprise continuously passing a stream composed of a mixture of hydrocarbon vapors in a powdered catalyst into a confined gravity-type separating zone, said zone having a vapor outlet in the top thereof and a catalyst outlet in its bottom, in said zone causing the hydrocarbon vapors to move upwardly toward and through the vapor outlet and the catalyst to precipitate downwardly for discharge through said catalyst outlet, directly transferring the precipitated catalyst to a centrifugal separator in which said catalyst and hydrocarbons present therein are subjected to forces effecting the separation of the catalyst solids from hydrocarbons in a vaporous state, and returning hydrocarbon vapors liberated in said centrifugal separator to the interior of said gravity- separating zone at a position between the mixture inlet of said zone and the vapor outlet thereof.

2. The process of separating a powdered catalyst from a stream of hydrocarbons in a vaporous state, the steps which comprise continuously passing a stream composed of a mixture of hydrocarbon vapors and a powdered catalyst into the interior of an upright gravity-operating separating zone, the mixture entering said zone through an inlet provided in said zone near the bottom thereof, there being a catalyst outlet in the bottom of said zone and a vapor outlet in the top thereof, in said zone causing the hydrocarbon vapors to move upwardly thereof toward and through said vapor outlet and the catalyst to precipitate downwardly for gravitational discharge through the catalyst outlet of the zone, transferring the precipitated catalyst and hydrocarbons present therein from the catalyst outlet to a centrifugal separator, in said centrifugal separator subjecting the catalyst and hydrocarbons present therein to forces separating the catalyst solids from the hydrocarbons present therein, returning the hydrocarbons separated from the catalyst in the centrifugal separator to the interior of said gravity-separating zone at a position between the mixture inlet of said last-named zone and the vapor outlet in the top thereof, removing solids from said centrifugal separator in a state suitable for reactivation, and removing vapors from the vapor outlet of the gravity-separating zone and fractionally condensing the same.

3. The process of separating a powdered catalyst from a stream of hydrocarbons in a vaporous state, the steps which comprise passing a mixture of such vaporous hydrocarbons and a powdered catalyst through an inlet provided in the lower part of a confined gravity-operating separating zone, the latter having a vapor outlet in the top thereof and a liquid-catalyst outlet in the bottom thereof below said inlet, in said zone causing the vapors of said mixture to move upwardly toward and through said vapor outlet and the catalyst of the mixture to precipitate downwardly together with liquid hydrocarbons for discharge through said liquid-catalyst outlet, bringing a descending scrubbing liquid into direct contact with ascending hydrocarbon vapors in said zone, removing the scrubbed vapors as an overhead product from the vapor outlet in the top of said zone, removing the mixture composed of the scrubbing liquid, hydrocarbon liquids and catalyst through the outlet in the bottom of said zone and cooling the same, collecting the cooled liquid-catalyst mixture in a confined receiving zone therefor, transferring liquid from said receiving zone to the upper interior portion of said first-named separating zone for use as the scrubbing liquid therein, removing catalyst solids from the bottom of said receiving zone, filter pressing the last-named solids to express their liquid content, and returning such expressed liquids to the receiving zone.

4. The process of separating a powdered catalyst from a stream of hydrocarbons in a vaporous state, the steps which comprise continuously passing a stream composed of a mixture of hydrocarbon vapors and a powdered catalyst into the interior of an upright gravity-operating separating zone, the mixture entering said zone through an inlet provided in said zone near the bottom thereof, there being a catalyst outlet in the bottom of said zone and a vapor outlet in the top thereof, in said zone causing the hydrocarbon vapors to move upwardly thereof toward and through said vapor outlet and the catalyst to precipitate downwardly for gravitational discharge through the catalyst outlet of the zone, transferring the precipitated catalyst and hydrocarbons present therein from the catalyst outlet to a centrifugal separator, in said centrifugal separator subjecting the catalyst and hydrocarbons present therein to forces separating the catalyst solids from the hydrocarbons present therein, returning the hydrocarbons separated from the catalyst in the centrifugal separator to the interior of said gravity-separating zone at a position between the mixture inlet of said last-named zone and the vapor outlet in the top thereof, removing solids from said centrifugal separator in a state suitable for reactivation, passing the hydrocarbon vapor stream containing entrained catalyst particles from the vapor outlet of the garvity-separating zone into the lower part of a scrubbing zone, the latter having a vapor outlet in the top thereof and a liquid-catalyst outlet in the bottom thereof below said inlet, in said last named scrubbing zone causing the vapors of said vapor-particle mixture to move upwardly toward and through said vapor outlet and the catalyst of the mixture to precipitate downwardly together with liquid hydrocarbons for discharge through said liquid-catalyst outlet, bringing a descending scrubbing liquid into direct contact with ascending hydrocarbon vapors in said scrubbing zone, removing the scrubbed vapors from hydrocarbon liquids as an overhead product from the vapor outlet in the top of said scrubbing zone, removing the mixture composed of the scrubbing liquid, hydrocarbon liquids and catalyst through the outlet in the bottom of said scrubbing zone and cooling the same, collecting the cooled liquid-catalyst mixture in a confined receiving zone therefor, transferring liquid from said receiving zone to the upper interior portion of said scrubbing zone for use as the scrubbing liquid therein, removing catalyst solids from the bottom of said receiving zone, filter pressing the last-named solids to express their liquid content, and returning such expressed liquids to the receiving zone.

5. Apparatus for separating a powdered catalyst from hydrocarbon vapor comprising an upright enlarged gravity separator having a vapor-catalyst mixture inlet, an outlet at the top of the separator for removing vapor and entrained particles and an outlet at the bottom thereof for removing catalyst and entrained vapors; a cyclone separator having an inlet near its top communicating with the bottom outlet of the gravity separator, said cyclone separator having an outlet in the top thereof communicating with that portion of the gravity separator below the top vapor outlet and above the mixture inlet thereof, and the said cyclone separator having a bottom outlet communicating with catalyst reactivating means; a dust separator having an inlet near the bottom thereof communicating with the top vapor outlet of the said gravity separator, the said dust separator having a bottom outlet, the said dust separator having liquid spray means in the top thereof for scrubbing vapors entering the said bottom inlet, a wash oil receiver having an inlet communicating with the bottom outlet of said dust separator, a cooler connected between said bottom outlet of the dust separator and the said wash oil receiver inlet, means for transferring wash oil from the said receiver to the said spray means, filter means having an inlet communicating with an outlet of said wash oil receiver, means for returning filtered liquid from the filter means to the wash oil receiver; and means for removing separated hydrocarbon vapor from the top of the dust separator.

WILLIAM W. HOLLAND.

REFERENCES CITED

The following references are of record in the file of this patent:

UNITED STATES PATENTS

| Number | Name | Date |
|---|---|---|
| 1,860,199 | Osterstrom | May 24, 1932 |
| 1,928,702 | O'Mara | Oct. 3, 1933 |
| 2,305,569 | Degnen | Dec. 15, 1942 |
| 2,327,175 | Conn | Aug. 17, 1943 |
| 2,370,816 | Schonberg | Mar. 6, 1945 |
| 2,400,645 | Huff | May 21, 1946 |
| 2,407,371 | Jahnig | Sept. 10, 1946 |
| 2,430,015 | Hatton et al. | Nov. 4, 1947 |
| 2,447,149 | Wier | Aug. 17, 1948 |